US012779538B2

(12) United States Patent
Wilkes

(10) Patent No.: US 12,779,538 B2
(45) Date of Patent: Nov. 3, 2026

(54) METHOD, DEVICE AND APPARATUS FOR CONTROLLING AN IRRADIATION BEAM

(71) Applicant: Nikon SLM Solutions AG, Luebeck (DE)

(72) Inventor: Jan Wilkes, Luebeck (DE)

(73) Assignee: Nikon SLM Solutions AG, Luebeck (DE)

( * ) Notice: Subject to any disclaimer, the term of this patent is extended or adjusted under 35 U.S.C. 154(b) by 439 days.

(21) Appl. No.: 18/282,295

(22) PCT Filed: Apr. 27, 2022

(86) PCT No.: PCT/EP2022/061131
§ 371 (c)(1),
(2) Date: Sep. 15, 2023

(87) PCT Pub. No.: WO2022/233653
PCT Pub. Date: Nov. 10, 2022

(65) Prior Publication Data

US 2024/0082921 A1 Mar. 14, 2024

(30) Foreign Application Priority Data

May 5, 2021 (DE) ..................... 10 2021 111 696.1

(51) Int. Cl.
*B22F 10/366* (2021.01)
*B22F 10/322* (2021.01)
(Continued)

(52) U.S. Cl.
CPC .......... *B22F 10/366* (2021.01); *B22F 10/322* (2021.01); *B22F 10/85* (2021.01);
(Continued)

(58) Field of Classification Search
None
See application file for complete search history.

(56) References Cited

U.S. PATENT DOCUMENTS 8,444,903 B2 * 5/2013 Lyons ..................... B29C 43/34
264/308
9,254,535 B2 * 2/2016 Buller ..................... B22F 10/28
(Continued)

FOREIGN PATENT DOCUMENTS

CN 203470904 U 3/2014
CN 105102160 A 11/2015
(Continued)

OTHER PUBLICATIONS

European Patent Office, International Search Report and Written Opinion for International Patent Application No. PCT/EP2022/061131, Jul. 29, 2022.

(Continued)

*Primary Examiner* — Devang R Patel
(74) *Attorney, Agent, or Firm* — Williams Mullen; Thomas F. Bergert

(57) ABSTRACT

We describe a method for controlling an irradiation beam for irradiating a layer of raw material powder in an additive layer manufacturing process for producing a three-dimensional work piece, wherein the method comprises: depositing, with a layer depositing mechanism, a said layer of raw material powder on top of a carrier and/or on top of a preceding material layer on top of the carrier; and controlling the irradiation beam to irradiate at least a portion of the layer of raw material powder in an irradiation area when a distance between the irradiation area and the layer depositing mechanism is above a threshold distance, and wherein the threshold distance is dependent on (i) a speed of movement of the layer depositing mechanism, and (ii) a speed, $v_g$, of a gas flow over the layer of raw material powder.

18 Claims, 4 Drawing Sheets

(51) Int. Cl.

| | |
|---|---|
| ***B22F 10/85*** | (2021.01) |
| ***B22F 12/50*** | (2021.01) |
| ***B22F 12/60*** | (2021.01) |
| ***B22F 12/70*** | (2021.01) |
| ***B33Y 10/00*** | (2015.01) |
| ***B33Y 30/00*** | (2015.01) |
| ***B33Y 50/02*** | (2015.01) |

(52) U.S. Cl.

CPC .............. *B22F 12/50* (2021.01); *B22F 12/60* (2021.01); *B22F 12/70* (2021.01); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 9,346,127 | B2 * | 5/2016 | Buller | B22F 12/52 |
| 9,956,612 | B1 * | 5/2018 | Redding | B23K 26/082 |
| 10,022,794 | B1 * | 7/2018 | Redding | B22F 10/322 |
| 10,831,180 | B2 * | 11/2020 | Gold | B33Y 50/02 |
| 11,565,315 | B2 * | 1/2023 | Cheng | B33Y 50/02 |
| 11,612,940 | B2 * | 3/2023 | Coward | B22F 10/68 |
| 2018/0345379 | A1 * | 12/2018 | Holford | B33Y 40/20 |
| 2019/0176233 | A1 | 6/2019 | Varetti et al. | |
| 2019/0176397 | A1 * | 6/2019 | Stapleton | B22F 5/009 |
| 2020/0023463 | A1 | 1/2020 | Dimter et al. | |
| 2021/0252601 | A1 * | 8/2021 | Kerl | B22F 12/70 |

FOREIGN PATENT DOCUMENTS

| | | | | | |
|---|---|---|---|---|---|
| CN | 105451970 | A | | 3/2016 | |
| CN | 106513672 | A | | 3/2017 | |
| CN | 109982792 | A | | 7/2019 | |
| CN | 111132820 | A | | 5/2020 | |
| CN | 112334294 | A | | 2/2021 | |
| DE | 102013205724 | | | 10/2014 | |
| DE | 102017218926 | | | 4/2019 | |
| DE | 102018203013 | | | 8/2019 | |
| GB | 2601736 | A | * | 6/2022 | B29C 64/329 |
| JP | 2016-517357 | | | 6/2016 | |

OTHER PUBLICATIONS

German Patent and Trademark Office, German Search Report for International Patent Application No. 10 2021 111 696.1, Mar. 28, 2022.

Japanese Patent Office, Japanese Examination Report for JP 2016-517357, Nov. 18, 2024.

China National Intellectual Property Administration, Office Action, Chinese Patent Application No. 202280025615.2, Jul. 28, 2025.

China National Intellectual Property Administration, Office Action, Chinese Patent Application No. 202280025615.2, Dec. 16, 2025.

* cited by examiner

METHOD, DEVICE AND APPARATUS FOR CONTROLLING AN IRRADIATION BEAM

CROSS-REFERENCE TO RELATED APPLICATIONS

This application is the U.S. national phase of international patent application PCT/EP2022/061131 filed on Apr. 27, 2022 and claims the benefit of German patent application No. 10 2021 111 696.1 filed on May 5, 2021, the entire disclosures of which are incorporated herein by way of reference.

The present invention generally relates to methods, devices and apparatus for controlling an irradiation beam in additive layer manufacturing.

In additive layering methods, work pieces are produced layer-by-layer by generating a sequence of solidified and interconnected work piece layers. These processes may be distinguished by the type of raw material and/or the way of solidifying said raw material in order to produce the work piece.

For example, powder bed fusion is a kind of additive layering process by which pulverulent, in particular metallic and/or ceramic raw materials, can be processed to three-dimensional work pieces of complex shapes. To that end, a raw material powder layer is applied onto a carrier and subjected to, for example, electron or laser radiation in a site selective manner in dependence on the desired geometry of the work piece that is to be produced. The radiation penetrating into the powder layer causes heating and consequently melting or sintering of the raw material powder particles. Further raw material powder layers are then applied successively to the layer on the carrier that has already been subjected to radiation treatment, until the work piece has the desired shape and size. Selective electron beam melting, selective laser melting or laser sintering can be used in particular for the production of prototypes, tools, replacement parts or medical prostheses, such as, for example, dental or orthopaedic prostheses, on the basis of CAD data.

Throughout the present disclosure, any references to selective laser melting are equally applicable to selective laser sintering, selective electron beam melting, stereolitography, MELATO, Selective Heat Sintering or any other energy beam based additive processing method. Hence, any references to additive layer manufacturing may be applicable to one or more of selective laser melting, selective laser sintering, selective electron beam melting, stereolitography, MELATO, Selective Heat Sintering and any other energy beam-based additive processing method.

An important parameter of additive layer construction methods is the quality of the produced work pieces. Moreover, production efficiency is crucial, e.g. in the sense of keeping production cycles as short as possible. For example, numerous strategies are known for speeding up the production of single work piece layers. However, when producing large work pieces, known solutions do not always achieve the desired efficiency and/or quality.

It is therefore an object of the present invention in particular to improve quality of the three-dimensional work piece produced using an additive layer manufacturing process. It is further an object of the present invention in particular to improve efficiency when preparing the three-dimensional work piece using an additive layer manufacturing process, while avoiding jeopardizing quality of the three-dimensional work piece produced.

We therefore describe a method for controlling an irradiation beam for irradiating a layer of raw material powder in an additive layer manufacturing process for producing a three-dimensional work piece, wherein the method comprises: depositing, with a layer depositing mechanism, a said layer of raw material powder on top of a carrier and/or on top of a preceding material layer on top of the carrier; and controlling the irradiation beam to irradiate at least a portion of the layer of raw material powder in an irradiation area when a distance between the irradiation area and the layer depositing mechanism is above a threshold distance, and wherein the threshold distance is dependent on (i) a speed of movement of the layer depositing mechanism, and (ii) a speed, $v_g$, of a gas flow over the layer of raw material powder.

The inventor has realized that a laminar gas flow over the layer of the powder bed may be disturbed in particular due to the movement of the layer depositing mechanism. As it may be desired to irradiate the layer of raw material powder already while the layer depositing mechanism moves, an irradiation area may need to be defined so that a distance of the irradiation area to parts of the layer of raw material powder over which the laminar gas flow is disturbed may be kept in particular during movement of the layer depositing mechanism. The gas flow in the irradiation area may thus no longer be disturbed due to turbulences which may have arisen due to the movement of the layer depositing mechanism. As a result, quality of the work piece to be produced is improved while preparing the three-dimensional work piece in an efficient manner since irradiation of the layer of raw material powder may be commenced while the layer depositing mechanism still moves.

While the speed of movement of the layer depositing mechanism (and, in some examples, the shape of the layer depositing mechanism, as will be outlined further below) may have an influence on any turbulences which may arise during movement of the layer depositing mechanism, the speed of the gas flow over the layer of raw material powder is also taken into account when controlling the irradiation beam. This is in particular the case according to example implementations of the present disclosure since any turbulences may be carried forward and away from the layer of raw material powder to be irradiated due to the gas flow. While the speed of the gas flow itself may, depending on the shape and/or the speed of movement of the layer depositing mechanism, cause turbulences in particular for speeds of the gas flow above a threshold speed, the larger the speed of the gas flow, the faster any turbulences may be carried away. A balance between those considerations may thus need to be found to optimize the speed of the gas flow in view of any operation conditions and parameters for producing the three-dimensional work piece.

As will be appreciated, the layer depositing mechanism may encounter acceleration and deceleration during movement. Therefore, throughout the present disclosure, any references to the speed of movement of the layer depositing mechanism may relate to one or more of an average speed of movement of the layer depositing mechanism over a part of the travel distance (in particular over the powder bed, i.e. the layer of raw material powder, noting that the layer depositing mechanism may move over one or more parts on which no (layer of) raw material powder has been deposited), an average speed of movement of the layer depositing mechanism over the complete travel distance of the layer depositing mechanism (wherein the complete travel distance may relate to one or more strokes of the layer depositing mechanism), and the speed of movement of the layer depositing mechanism at a concrete location (in particular over the powder bed, i.e. the layer of raw material powder).

In some examples, the distance is kept above the threshold distance while the layer depositing mechanism moves across the carrier and/or the preceding material layer on top of the carrier. This may ensure improving efficiency of the production of the three-dimensional work piece while allowing for a high quality of the work piece produced.

In some examples, the gas flow flows in a first direction parallel to a plane defined by the carrier, wherein the layer depositing mechanism is configured to move in a second direction which is perpendicular or substantially perpendicular to the first direction, wherein the second direction is parallel to the plane defined by the carrier, and wherein the threshold distance is proportional to $v_{ldm}/v_g$ in the second direction, wherein $v_{ldm}$ is the speed of movement of the layer depositing mechanism in the second direction. This may ensure high quality of the work piece produced since the layer of raw material powder may not be irradiated in an area over which turbulences may occur. In some examples, the threshold distance in the second direction is p $v_{ldm}/v_g$+o, wherein p is a factor>0, and wherein o is an offset>0. The offset may, in some examples, be between 10 mm and 50 mm (e.g. 10 mm, 15 mm, 20 mm, . . . , 50 mm). The offset may, in some examples, be variable, for example variable between 10 mm and 50 mm, in particular in a step-wise manner (for example in steps of 1 mm or 0.1 mm) and/or continuously. The offset may ensure that the irradiation area is further away from an area over which any turbulences may occur. The offset may e.g. be selected in dependence of one or more machine/apparatus parameters, such as, e.g., a possible deflection speed of the (one or more) scanner optics mirrors (e.g. a speed of rotation of the one or more scanner optics mirrors), and/or system latency times for control signals and/or the shape of the layer depositing mechanism. In some examples, p may represent a distance value in the first direction. In this case, the threshold distance may be lower on the gas inlet side of the layer of raw material powder than on the gas outlet side of the layer of raw material powder. The starting point for the distance value (p=0) may preferably be at the gas inlet, at the edge of the raw material powder layer or at a point therebetween.

In some examples, a speed of the gas flow may be measured at one or more heights above the layer of raw material powder. In some examples, the one or more heights may be between 5 mm and 50 mm above the layer of raw material powder, so that the speed of the gas flow may be measured at one or more heights between 5 mm and 50 mm. The gas flow may hereby be measured, in some examples, at two or more heights in a stepwise manner, for example in steps of 1 mm or 0.1 mm, and/or continuously, in particular between 5 mm and 50 mm. Additionally or alternatively, the speed of the gas flow may be measured at a height of the gas inlet.

In some examples, the speed of the gas flow may be measured at one or more points/locations in the build chamber, in particular at the gas inlet and/or the gas outlet and/or the gas inlet-side edge/edge region of the powder bed (i.e. layer of raw material powder) and/or the gas outlet-side edge/edge region of the powder bed and/or above the powder bed. Throughout the present disclosure, any references to the “gas flow velocity” may refer to the measured value at one of these points/locations, or an average value of one or more (in particular any combination) of the measured values at two or more of these points/locations.

In some examples, the irradiation area excludes an area on the layer of raw material powder which is closer to the layer depositing mechanism than the threshold distance when the layer depositing mechanism moves parallel to the carrier and/or the preceding material layer. Irradiation of the layer of raw material powder may thus be avoided in areas where any turbulences due to the movement of the layer depositing mechanism may still be present.

In some examples, the threshold distance is further dependent on the shape of the layer depositing mechanism. As will be appreciated, the shape of the layer depositing mechanism may in particular cause any turbulences in case the layer depositing mechanism is not provided with an aerodynamic shape (or even when it has an aerodynamic shape). It will be appreciated that the higher the speed of movement of the layer depositing mechanism, the more pronounced any turbulences might be. Further still, as outlined above, while the speed of the gas flow itself may, depending on the shape and/or the speed of movement of the layer depositing mechanism, cause turbulences in particular for speeds of the gas flow above a threshold speed, the larger the speed of the gas flow, the faster any turbulences may be carried away. The foregoing parameters may thus be taken into account when controlling the irradiation beam, in particular when the layer depositing mechanism moves across the carrier and/or the preceding material layer on top of the carrier.

In some examples, the threshold distance is further dependent on a gas flow direction of the gas flow. The direction of the gas flow may influence where and to what extent any turbulences may occur. Taking the direction of the gas flow into account may thus allow for preparing a three-dimensional work piece with even higher quality, while ensuring that the three-dimensional work piece may be produced already while the layer depositing mechanism still moves.

In some examples, the speed, $v_g$, of the gas flow over the layer of raw material powder comprises the speed, $v_g$, of the gas flow in a volume within a threshold height from the layer depositing mechanism when the layer depositing mechanism moves parallel to the carrier and/or the preceding material layer. As will be appreciated, this parameter may allow for determining to what extent any potential turbulences may (still) be present within the threshold distance to the layer depositing mechanism. This may allow for commencing irradiating the layer of raw material powder at an early stage when the layer depositing mechanism is moving.

In some examples, the excluded area is proportional to $1/v_g$. In other words, the higher the speed of the gas flow (for example at one or more predefined heights above the layer of raw material powder), the smaller the excluded area. This is because for higher speeds of the gas flow, any turbulences may be carried away faster by the gas flow.

In some examples, the speed of movement of the layer depositing mechanism is adjustable from 0 m/s to 0.5 m/s, in particular continuously and/or in 0.01 m/s increments. A speed of, for example, 0.2 m/s may allow for efficient preparation of the layer of raw material powder by the layer depositing mechanism when the layer depositing mechanism moves, while any turbulences caused due to the movement of the layer depositing mechanism may be kept at a reasonable level or reasonable minimum.

In some examples, the layer depositing mechanism has a rectangular or substantially rectangular shape from a cross-sectional point of view perpendicular to a plane in which the carrier and/or the preceding material layer on top of the carrier extend, and wherein the irradiation area excludes a region on a side of the layer depositing mechanism which is opposite to a direction of movement of the layer depositing mechanism in the plane. This example allows for taking into account any potential turbulences which may in particular or predominantly be formed behind the layer depositing mechanism, that is on the side of the layer depositing mechanism which faces away from the direction of movement of the layer depositing mechanism.

In some examples, the region has a triangular or substantially triangular shape, and wherein a cathetus of the triangle is formed by the side of the layer depositing mechanism which is opposite to the direction of movement of the layer depositing mechanism in the plane. The inventor has realized that any potential turbulences may occur in particular in such a triangular or substantially triangular region, so that this phenomenon may be taken into account when controlling the irradiation beam, and in particular when determining which part or parts of the layer of raw material powder to exclude from irradiation (for at least a predefined time period) which are within the threshold distance from the layer depositing mechanism. In some examples, a side of the irradiation area is defined by a hypotenuse of the triangle, and wherein the triangle is arranged between the layer depositing mechanism and the irradiation area.

In some examples, $v_g$ is between 1.0 m/s and 2.0 m/s, in particular 1.5 m/s, more particularly wherein $v_g$ is adjustable. This has been proven to be a speed of the gas flow which does not cause too many turbulences itself when the gas flow passes the (moving) layer depositing mechanism, while the gas flow can efficiently remove any turbulences caused due to the movement of the layer depositing mechanism.

In some examples, the irradiation of the layer of raw material powder is controlled to commence in an area in which the layer depositing mechanism started forming the layer of raw material powder. It is this area in which any potential turbulences may have already (or first) be carried away by the gas flow.

In some examples, the irradiation of the layer of raw material powder is controlled to commence at a location opposite or generally opposite to a gas inlet for the gas flow. This allows for irradiating the layer of raw material powder in a direction against the gas flow direction, such that any fumes created due to the irradiation of the layer of raw material powder do not affect subsequently irradiating the layer of raw material powder in unsolidified areas of the layer. In some examples, the irradiation is controlled to continue against a direction of the gas flow.

In some examples, the irradiation beam and/or a second irradiation beam is controlled to irradiate an area towards which the layer depositing mechanism moves in a plane in which the carrier and/or the preceding material layer on top of the carrier extend. It may be assumed that in this area no (or comparatively little) turbulences occur. In some examples, the area towards which the layer depositing mechanism moves in the plane is changed during irradiation to be at a predefined safety distance from the layer depositing mechanism, which may allow ensuring that no (or comparatively little) turbulences occur in this area to be irradiated.

We further describe a computer program product comprising program code portions for performing the method of any of the example implementations as described herein when the computer program product is executed on one or more computing devices. The computer program product may, in some examples, be stored on a computer-readable recording medium.

We further describe a device for controlling an irradiation beam for irradiating a layer of raw material powder in an additive layer manufacturing process for producing a three-dimensional work piece, wherein the device comprises: one or more processors, and a memory operatively coupled to the one or more processors, wherein the memory is configured to store program code portions which, when executed by the one or more processors, cause the device to control the irradiation beam to irradiate at least a portion of the layer of raw material powder in an irradiation area when a distance between the irradiation area and a layer depositing mechanism used to deposit the layer of raw material powder on top of a carrier and/or on top of a preceding material layer on top of the carrier is above a threshold distance, wherein the threshold distance is dependent on (i) a speed of movement of the layer depositing mechanism and (ii) a speed, $v_g$, of a gas flow over the layer of raw material powder. The device may in particular be configured to perform the method according to any of the example implementations outlined throughout the present disclosure.

We further describe an apparatus for producing a three-dimensional work piece via an additive layer manufacturing method, wherein the apparatus comprises: a carrier configured to receive material for producing the three-dimensional work piece; a material supply unit configured to supply material to the carrier and/or one or more preceding material layers on top of the carrier, a layer depositing mechanism for forming the supplied material into a material layer on top of the carrier and/or the one or more preceding material layers on top of the carrier, a solidification device configured to solidify the material supplied to the carrier and/or the one or more preceding material layers on top of the carrier for producing the three-dimensional work piece, a gas supply unit configured to supply a shielding gas to an area of the material layer that is to be solidified by the solidification device, a process chamber comprising the gas supply unit and the solidification device, and a device according to any of the example implementations outlined throughout the present disclosure. In some examples, the apparatus comprises the computer program product according to any of the example implementations outlined throughout the present disclosure.

These and other aspects of the invention will now be further described, by way of example only, with reference to the accompanying figures, wherein like reference numerals refer to like parts, and in which:

FIG. 1 shows a schematic illustration in cross-section of an apparatus for producing a three-dimensional work piece using an additive layer manufacturing process according to some example implementations as described herein;

FIGS. 2*a* and *b* show a cross-sectional side view and a top view, respectively, of a layer depositing mechanism used during an additive layer manufacturing process according to some example implementations as described herein;

Figure 1:
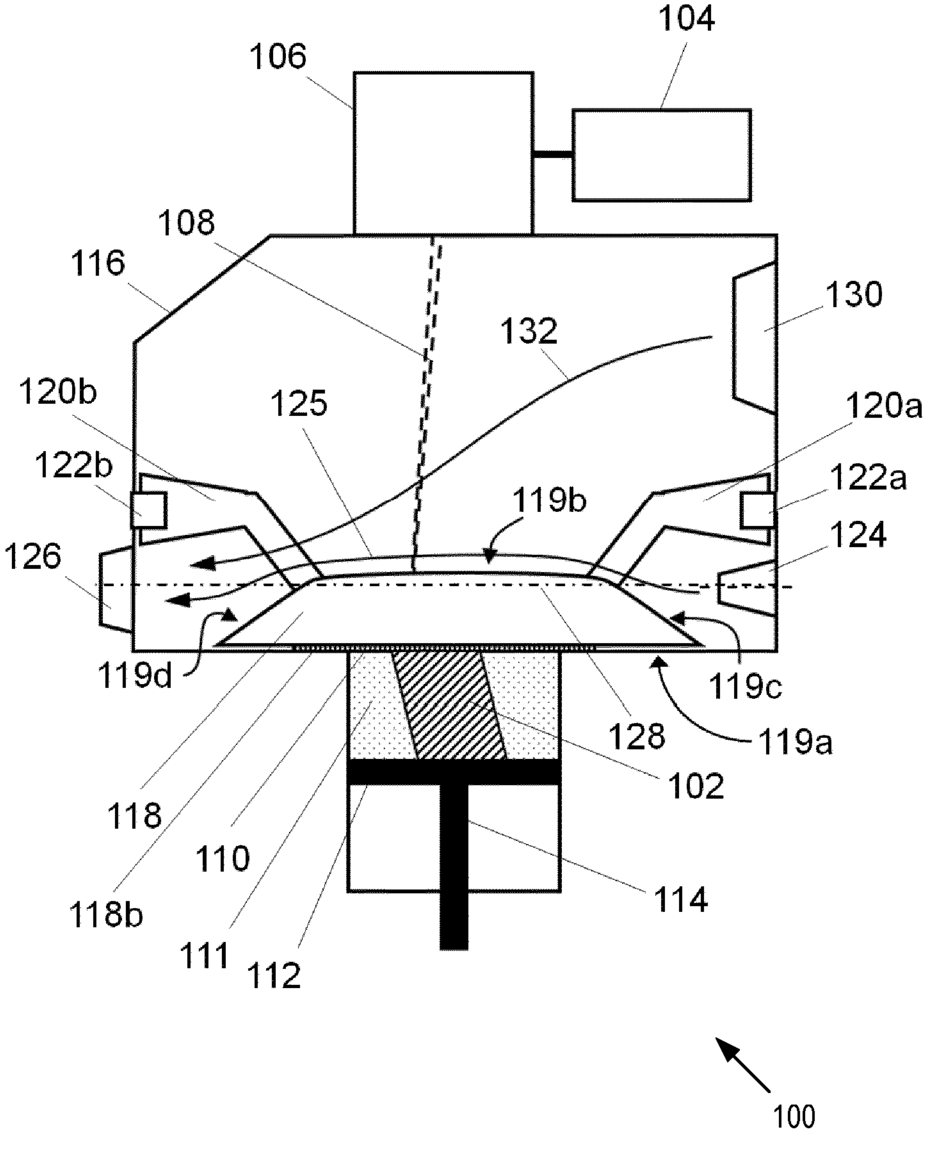

The inventor has realized that when the layer depositing mechanism is moved, the laminar gas flow over the powder bed may be disturbed.

If the irradiation of the layer of raw material powder is to be started while the layer depositing mechanism is still moving, a sufficiently large distance to the layer depositing mechanism may need to be maintained in order to start the irradiation in the already calmed gas flow area. Irradiation can be started during the coating process if the gas flow in a region of the build platform has already reached the desired state again.

Since the turbulence is carried on by the gas flow, the turbulent region is formed, in some examples, in an idealized triangle behind the layer depositing mechanism. As will be appreciated, the shape of the turbulent region is based, amongst others, in some examples on the shape of the layer depositing mechanism, which may take all sorts of shapes.

The extension of, in the present example, the triangle behind the layer depositing mechanism may be influenced by the speed of movement of the layer depositing mechanism (in some examples approx. 0.2 m/s), in some examples the shape of the layer depositing mechanism (due to turbulence generation), and the speed of the gas flow (in some examples approx. 1.5 m/s at, for example, a height of 30 mm above the powder bed). In some examples, a typical width of the powder bed is between 150 mm and 1000 mm.

The distance from the layer depositing mechanism at which turbulences should no longer occur ("calming distance") can either be set as a distance parallel to the layer depositing mechanism, which is calculated, in some examples, by the longest extension of the triangle (at the offside edge of the gas flow) and, in some examples, an offset (additional safety distance). Alternatively, a boundary parallel to the hypotenuse (along it or in addition to an offset) is possible, i.e. the irradiation can, in some examples, start earlier on the upstream side of the gas flow than on the downstream side.

The irradiation may be started in particular at the edge of the powder bed, at which the layer depositing mechanism has started moving across the powder bed, preferably additionally opposite the gas inlet, so the irradiation process can be performed against the gas flow. Irradiation may be started as soon as at the offside edge the layer depositing mechanism has covered at least the calming distance.

In addition, an irradiation "in front" of the layer depositing mechanism can take place simultaneously (by means of the same irradiation source and/or a second irradiation source). Only a small safety distance to the layer depositing mechanism may, in some examples, be maintained, so that a calm (laminar) gas flow can be assumed in this area in front of the layer depositing mechanism.

In particular, the present invention relates to methods, devices and apparatus for producing a three-dimensional work piece using an additive layer manufacturing process, and a layer depositing mechanism used therein.

Examples described herein allow an increase in productivity in the additive layer manufacturing process, and in particular in selective laser melting machines. The examples according to the present disclosure allow that already during the coating (with powder material) the irradiation can be started or at least after the layer depositing mechanism has left the region of the build platform, the gas flow in a region of the build platform has already reached the desired state again and thus the irradiation of the next layer can be started immediately without any loss of quality.

In some examples, the layer depositing mechanism and the (mechanical) layer depositing mechanism suspension or attachment of the layer depositing mechanism are designed in such a way that the gas flow that is guided over the build platform is influenced as little as possible. In some examples, the layer depositing mechanism suspension is designed as a grid structure, in particular a honeycomb structure or lamellar structure, or as individual narrow webs whose cross-sectional area in a sectional plane perpendicular to the gas flow direction is relatively small compared to an area in the sectional plane bounded by an outer contour of the layer depositing mechanism suspension or the layer depositing mechanism. The layer depositing itself is, in some examples, aerodynamically shaped, and in some examples may have softly tapered side surfaces to minimize turbulence as the gas flow passes over it.

FIG. 1 shows a schematic cross-sectional view of an apparatus 100 for producing a three-dimensional work piece 102 using an additive layer manufacturing process.

In this example, the apparatus 100 includes an irradiation unit 104 (for example, a laser or particle beam generator) coupled to a deflection unit (scanner) 106 such that an irradiation beam 108 can be directed to a powder layer 110 or bed. By controlling the irradiation beam 108 in this manner, the work piece 102 can be produced appropriately, with powder material 111 not being solidified in some areas by the irradiation beam 108.

In this example, the apparatus includes a carrier 112 on which the three-dimensional work piece 102 is produced. The carrier 112 can be moved vertically within the process chamber 116 by a lifting mechanism 114, as in this example.

In this example, the apparatus 100 comprises a substantially pyramidal or trapezoidal layer depositing mechanism 118. In all examples of the present disclosure, the layer depositing mechanism may also have only one inclined side surface (for example, the side surface facing the gas inlet or outlet), with the other side surfaces being perpendicular to the carrier plane.

In this example, the layer depositing mechanism 118 of the apparatus 100 has a lower side **119*a* and an opposite side 119*b* parallel thereto, the side 119*a* on which powder material is applied to the carrier and/or a powder bed having a larger area than the side 119*b*. A powder spreading device 118*b* (i.e., a spreading element or scraper element, such as a coater lip, brush, roller, or pusher) is attached to the lower side of the layer depositing mechanism 118**.

In this example, the layer depositing mechanism 118 has softly tapered side surfaces **119*c* and 119*d*. In particular, the transitions between the side surface 119*c* and the side 119*b* and between the side 119*b* and the side surface 119*d* are convex in shape so that a gas flow can be directed over the layer depositing mechanism 118** without causing turbulence (or only causing little turbulence) in the gas flow.

In this example, the layer depositing mechanism 118 is coupled to a layer depositing mechanism suspension **120*a* and 120*b* in two regions. In some examples, the layer depositing mechanism is coupled to the layer depositing mechanism suspension in only one region. In this example, the apparatus 100 further comprises guide rails and/or drives 122*a* and 122*b* by which the layer depositing mechanism 118 together with the layer depositing mechanism suspension 120*a* and 120*b* can be moved over the carrier 112 or, in this example, over the powder layer 110**.

The apparatus 100 further comprises, in this example, a gas inlet 124 and a gas outlet 126, whereby a gas flow 125 can be generated in the apparatus 100 which, when the layer depositing mechanism 118 is not located above the carrier 112, forms a gas flow, in particular a laminar gas flow, above the carrier 112, or the uppermost powder layer 110. The axis 128 between the gas inlet 124 and the gas outlet 126 is shown in dashed lines. In this example, the apparatus further comprises a gas inlet 130 to generate a second gas flow 132 between the gas inlet 130 and the gas outlet 126.

Surface(s) **119*c* of the layer depositing mechanism 118 opposite the gas inlet nozzle (i.e., gas inlet 124) acts as a gas conducting surface and is therefore preferably formed at an angle of between 0° and 90°, in this example about 45° to the axis 128**.

The layer depositing mechanism suspension **120*a* on the side of surface 119*c* and/or the other side 119*d*** is formed at least partially as a gas-flowable structure, in particular as a grid structure and/or lamellar structure.

In this example, the gas flowable structure of the layer depositing mechanism suspension 120_a_,120_b_ has at least partially a flow-directing cross-section, in particular an elliptical or teardrop shaped cross-section.

In this example, the surface 119_d_ of the layer depositing mechanism 118 opposite the gas outflow opening, i.e., the gas outlet 126, also functions as a gas-guiding surface and is preferably at an angle between 0° and 90°, in this example about 45° to the axis 128. In particular, the angle may be the same as that of surface 119_c_ to the axis 128. Alternatively, the layer depositing mechanism 118 may also be continued in the direction of the outflow opening, in particular up to the wall containing the outflow opening, i.e. the gas outlet 126, and at least partially cover the gas outlet 126.

In this example, the transition from side 119_c_ and/or the transition from side 119_d_ to the upper surface/side 119_b_ of the layer depositing mechanism 118 is convex in shape to allow the gas flow to contact the surface and avoid turbulence.

In some examples, the front and/or rear sides of the layer depositing mechanism 118 are also angled. Alternatively, the front and/or rear of the layer depositing mechanism 118 may be configured to be angled during movement across the powder layer 110, and in one or both of the parking positions (on opposite sides of the powder layer), may be moved to an upright position to just abut the process chamber wall. This mechanism is coupled to the opening of a powder chute in some examples.

Flow-guiding sections of the layer depositing mechanism suspension 120_a_, 120_b_ can be designed in such a way that the gas flow is deflected differently depending on the direction of movement, and the sections can in particular be designed to be adjustable for this purpose. Depending on the direction of movement, they can then be aligned in the direction of the resulting relative flow direction in order to influence the gas flow as little as possible.

Figure 2A:
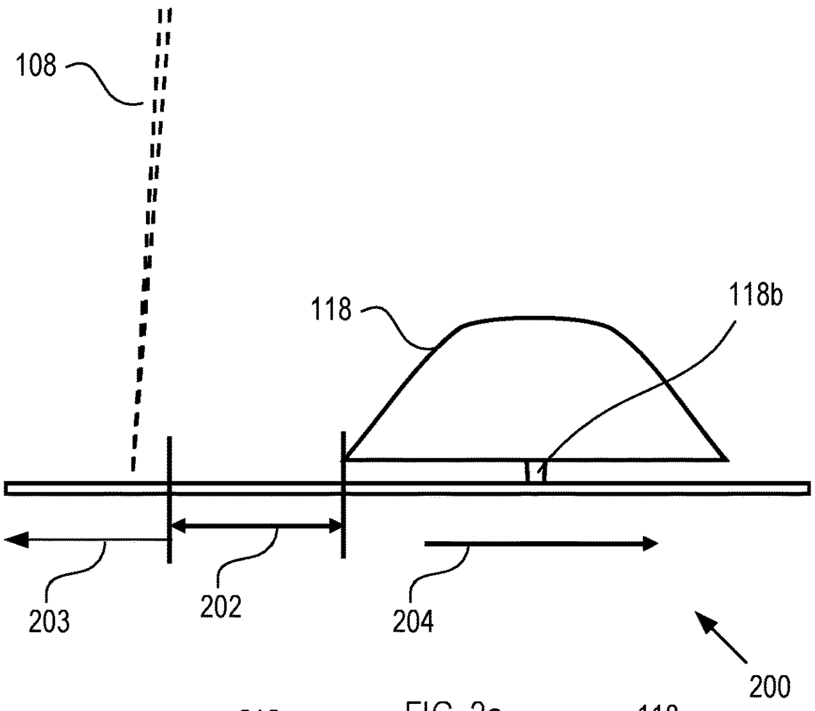
Figure 2B:
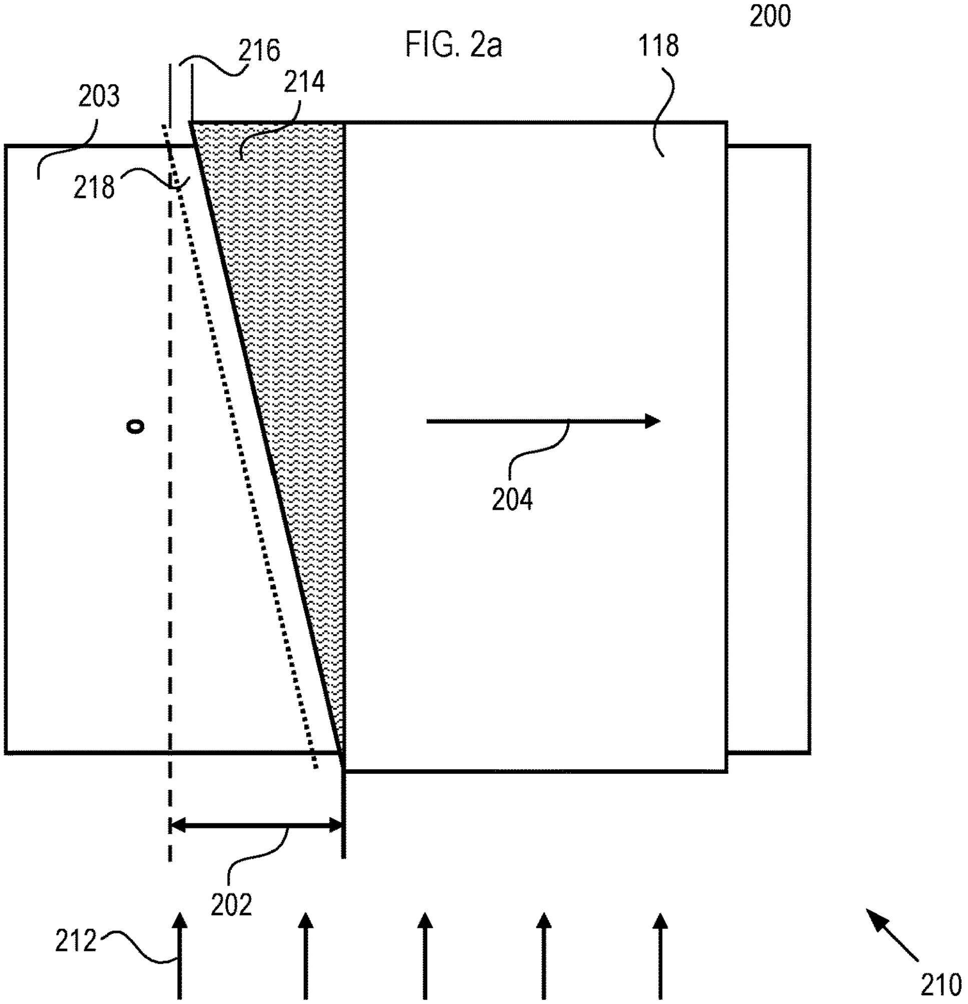

FIG. 2_a_ shows a cross-sectional side view 200 of a schematic illustration of a layer depositing mechanism 118 used during an additive layer manufacturing process according to some example implementations as described herein.

As can be seen, a distance 202 (dubbed "calming distance" as outlined above) may be maintained between on the one hand an irradiation area 203 in which the irradiation beam 108 solidifies raw material powder and on the other hand the layer depositing mechanism 118 while the layer depositing mechanism 118 moves in the direction of movement 204. It may thus be ensured that the irradiation beam 108 does not irradiate raw material powder too close to the layer depositing mechanism 118 in which turbulences may occur. The distance 202 is, in this example, determined based on the shape of the layer depositing mechanism 118, the speed of movement of the layer depositing mechanism 118 and the speed of the gas flow over the layer of raw material powder.

FIG. 2_b_ shows a top view 210 of a schematic illustration of a layer depositing mechanism 118 used during an additive layer manufacturing process according to some example implementations as described herein.

The gas flow 212 above the layer of raw material powder and the layer depositing mechanism 118 is indicated via arrows.

As can be seen, in this example, a (hypothetical) triangle 214 is formed between the irradiation area 203 and the layer depositing mechanism 118, whereby turbulences may occur in the area of the triangle 214, such that this area should be excluded from being irradiated by the irradiation beam 108. This area changes as the layer depositing mechanism 118 moves.

In this example, an offset (dashed lines in FIG. 2_b_) is provided between the triangle 214 area and the irradiation area 203, which may allow for a further safety distance to be provided between the layer depositing mechanism 118 and the irradiation area 203 to ensure that no turbulences (or only turbulences below a threshold) occur in the irradiation area 203. The offset may, in examples in which the distance 202 is defined in parallel to the layer depositing mechanism 118, be defined as an offset 216 lying parallel to the edge of the layer depositing mechanism 118 which lies opposite to the movement direction of the layer depositing mechanism 118. In examples in which an edge of the irradiation area 203 is defined by the hypotenuse of the triangle 214, the offset may be defined as an offset 218 aligned in parallel to the hypotenuse of the triangle 214. The offset 216 and/or the offset 218 is, in this example, between 10 mm and 50 mm. The offset 216 and/or the offset 218 may be variable (as outlined above, for example in a step-wise manner in steps of, for example, 1 mm or 0.1 mm, and/or in a continuous manner).

In this example, the irradiation is started at the edge of the powder bed at which the layer depositing mechanism has started its movement (and preferably additionally opposite the gas inlet, so irradiation against the gas flow may be provided). Irradiation is, in this example, started as soon as at the offside edge the layer depositing mechanism has covered at least the distance 202.

Figure 3:
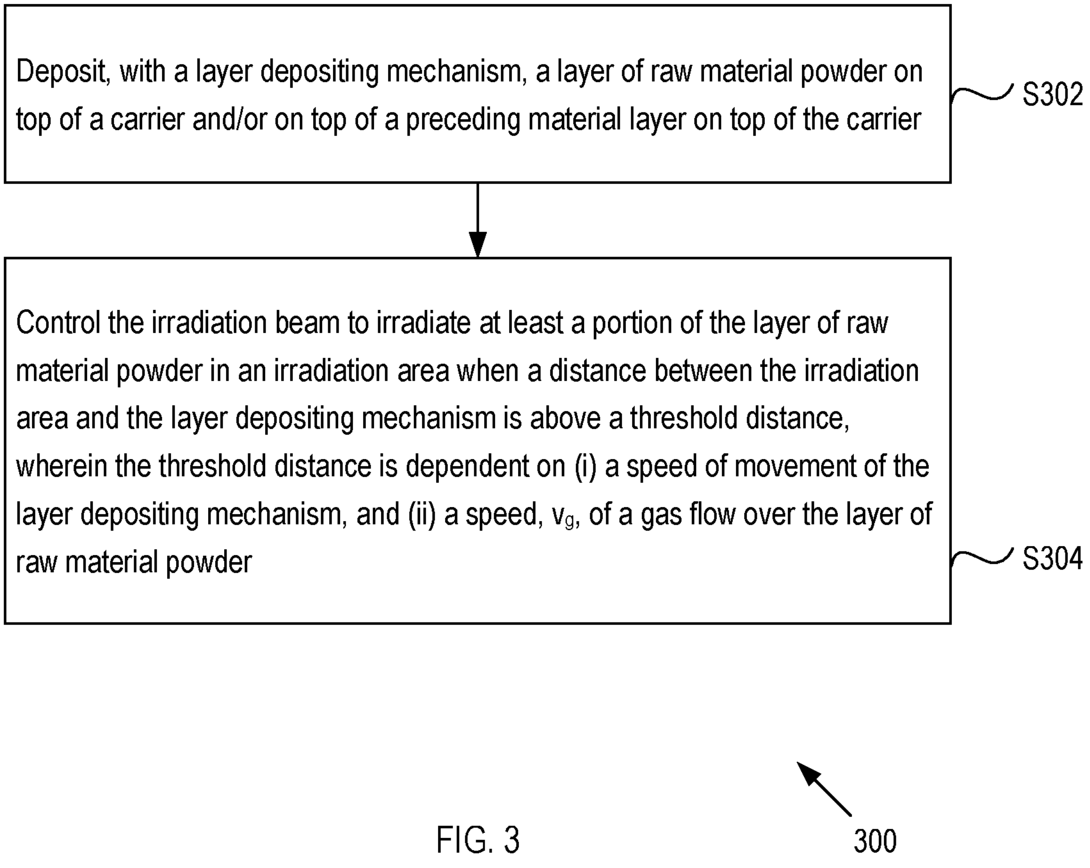
FIG. 3 shows a flow diagram of a method according to some example implementations as described herein.

FIG. 3 shows a flow diagram of a method 300 according to some example implementations as described herein.

In this example, the method 300 comprises depositing, at step S302, with a layer depositing mechanism, a layer of raw material powder on top of a carrier and/or on top of a preceding material layer on top of the carrier. At step S304, the method 300 comprises controlling the irradiation beam to irradiate at least a portion of the layer of raw material powder in an irradiation area when a distance between the irradiation area and the layer depositing mechanism is above a threshold distance, wherein the threshold distance is dependent on (i) a speed of movement of the layer depositing mechanism, and (ii) a speed, $v_g$, of a gas flow over the layer of raw material powder.

Figure 4:
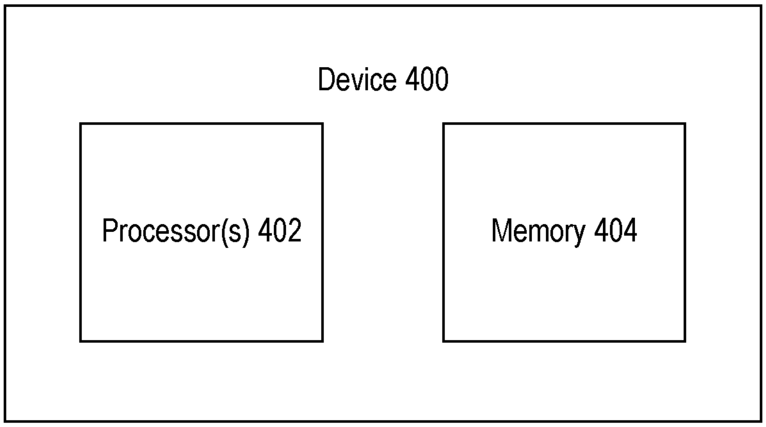
FIG. 4 shows a block diagram of a device according to some example implementations as described herein.

FIG. 4 shows a block diagram of a device 400 for controlling an irradiation beam for irradiating a layer of raw material powder in an additive layer manufacturing process for producing a three-dimensional work piece according to some example implementations as described herein.

In this example, the device 400 comprises one or more processors 402, and a memory 404 operatively coupled to the one or more processors, wherein the memory is configured to store program code portions which, when executed by the one or more processors, cause the device to control the irradiation beam to irradiate at least a portion of the layer of raw material powder in an irradiation area when a distance between the irradiation area and a layer depositing mechanism used to deposit the layer of raw material powder on top of a carrier and/or on top of a preceding material layer on top of the carrier is above a threshold distance, wherein the threshold distance is dependent on (i) a speed of movement of the layer depositing mechanism and (ii) a speed, $v_g$, of a gas flow over the layer of raw material powder.

Figure 5:
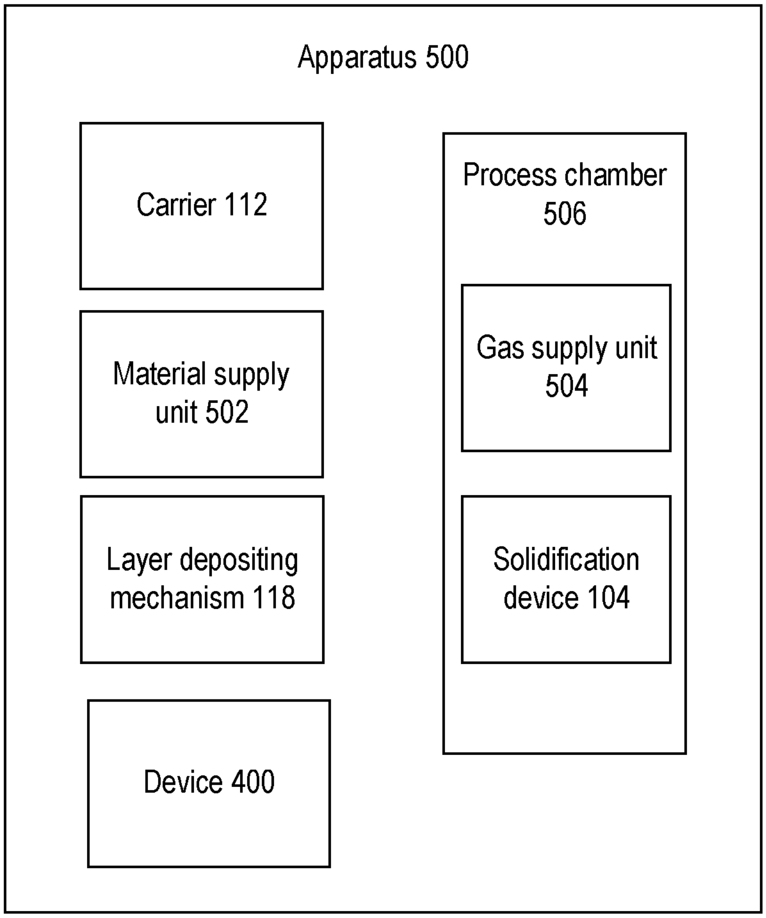
FIG. 5 shows a block diagram of an apparatus according to some example implementations as described herein.

FIG. 5 shows a block diagram of an apparatus 500 for producing a three-dimensional work piece via an additive layer manufacturing method according to some example implementations as described herein.

In this example, the apparatus 500 comprises a carrier 112 configured to receive material for producing the three-dimensional work piece; a material supply unit 502 configured to supply material to the carrier and/or one or more preceding material layers on top of the carrier, a layer depositing mechanism 118 for forming the supplied material into a material layer on top of the carrier and/or the one or more preceding material layers on top of the carrier, a solidification device 104 configured to solidify the material supplied to the carrier and/or the one or more preceding material layers on top of the carrier for producing the three-dimensional work piece, a gas supply unit 504 configured to supply a shielding gas to an area of the material layer that is to be solidified by the solidification device, a process chamber 506 comprising the gas supply unit and the solidification device, and a device 400 according to examples (in particular FIG. 4) outlined herein. The carrier 112, the material supply unit 502 and the layer depositing mechanism 118 may also be arranged within the process chamber 506.

No doubt many other effective alternatives will occur to the skilled person. It will be understood that the invention is not limited to the described embodiments and example implementations and encompasses modifications apparent to those skilled in the art and lying within the scope of the claims appended hereto.

The invention claimed is:

1. A method for controlling an irradiation beam for irradiating a layer of raw material powder in an additive layer manufacturing process for producing a three-dimensional work piece, wherein the method comprises:

depositing, with a layer depositing mechanism, a said layer of raw material powder on top of a carrier and/or on top of a preceding material layer on top of the carrier; and controlling the irradiation beam to irradiate at least a portion of the layer of raw material powder in an irradiation area when a distance between the irradiation area and the layer depositing mechanism is above a threshold distance, and wherein the threshold distance is dependent on (i) a speed of movement of the layer depositing mechanism, and (ii) a speed, vg, of a gas flow over the layer of raw material powder, wherein the gas flow flows in a first direction parallel to a plane defined by the carrier, wherein the layer depositing mechanism is configured to move in a second direction which is perpendicular or substantially perpendicular to the first direction, wherein the second direction is parallel to the plane defined by the carrier, wherein the threshold distance is proportional to $v_{ldm}/v_g$ in the second direction, wherein $v_{ldm}$ is the speed of movement of the layer depositing mechanism in the second direction.

2. A method as claimed in claim 1, wherein the distance is kept above the threshold distance while the layer depositing mechanism moves across the carrier and/or the preceding material layer on top of the carrier.

3. A method as claimed in claim 1, wherein the threshold distance in the second direction is $p \cdot v_{ldm}/v_g+o$, wherein p is a factor >0, and wherein o is an offset >0.

4. A method as claimed in claim 1, wherein the irradiation area excludes an area on the layer of raw material powder which is closer to the layer depositing mechanism than the threshold distance when the layer depositing mechanism moves parallel to the carrier and/or the preceding material layer.

5. A method as claimed in claim 1, wherein the threshold distance is further dependent on the shape of the layer depositing mechanism.

6. A method as claimed in claim 1, wherein the threshold distance is further dependent on a gas flow direction of the gas flow.

7. A method as claimed in claim 1, wherein the speed, $v_g$, of the gas flow over the layer of raw material powder comprises the speed, $v_g$, of the gas flow in a volume within a threshold height from the layer depositing mechanism when the layer depositing mechanism moves parallel to the carrier and/or the preceding material layer.

8. A method as claimed in claim 1, wherein the layer depositing mechanism has a rectangular or substantially rectangular shape from a cross-sectional point of view perpendicular to a plane in which the carrier and/or the preceding material layer on top of the carrier extend, and wherein the irradiation area excludes a region on a side of the layer depositing mechanism which is opposite to a direction of movement of the layer depositing mechanism in the plane.

9. A method as claimed in claim 8, wherein the region has a triangular or substantially triangular shape, and wherein a cathetus of the triangle is formed by the side of the layer depositing mechanism which is opposite to the direction of movement of the layer depositing mechanism in the plane.

10. A method as claimed in claim 9, wherein a side of the irradiation area is defined by a hypotenuse of the triangle, and wherein the triangle is arranged between the layer depositing mechanism and the irradiation area.

11. A method as claimed in claim 1, wherein $v_g$ is between 1.0 m/s and 2.0 m/s.

12. A method as claimed in claim 1, wherein the irradiation of the layer of raw material powder is controlled to commence in an area in which the layer depositing mechanism started forming the layer of raw material powder.

13. A method as claimed in claim 1, wherein the irradiation of the layer of raw material powder is controlled to commence at a location opposite or generally opposite to a gas inlet for the gas flow, wherein the irradiation is controlled to continue against a direction of the gas flow.

14. A method as claimed in claim 1, wherein the irradiation beam and/or a second irradiation beam is controlled to irradiate an area towards which the layer depositing mechanism moves in a plane in which the carrier and/or the preceding material layer on top of the carrier extend.

15. A method as claimed in claim 14, wherein the area towards which the layer depositing mechanism moves in the plane is changed during irradiation to be at a predefined safety distance from the layer depositing mechanism.

16. A computer program product comprising program code portions for performing the method of claim 1 when the computer program product is executed on one or more computing devices.

17. The computer program product of claim 16, stored on a computer-readable recording medium.

18. A device for controlling an irradiation beam for irradiating a layer of raw material powder in an additive layer manufacturing process for producing a three-dimensional work piece, wherein the device comprises:

one or more processors, and a memory operatively coupled to the one or more processors, wherein the memory is configured to store program code portions which, when executed by the one or more processors, cause the device to control the irradiation beam to irradiate at least a portion of the layer of raw material powder in an irradiation area when a distance between the irradiation area and a layer depositing mechanism used to deposit the layer of raw material powder on top of a carrier and/or on top of a preceding material layer on top of the carrier is above a threshold distance, wherein the threshold distance is dependent on (i) a speed of movement of the layer depositing mechanism and (ii) a speed, vg, of a gas flow over the layer of raw material powder, wherein the gas flow flows in a first direction parallel to a plane defined by the carrier, wherein the layer depositing mechanism is configured to move in a second direction which is perpendicular or substantially perpendicular to the first direction, wherein the second direction is parallel to the plane defined by the carrier, wherein the threshold distance is proportional to $v_{ldm}/v_g$ in the second direction, wherein $v_{ldm}$ is the speed of movement of the layer depositing mechanism in the second direction.

* * * * *